(12) United States Patent
Newcomb

(10) Patent No.: US 10,878,149 B1
(45) Date of Patent: Dec. 29, 2020

(54) LOGICAL DETECTION OF HIGH IMPEDANCE FLOATING FET GATES

(71) Applicant: Jesse Conrad Newcomb, San Francisco, CA (US)

(72) Inventor: Jesse Conrad Newcomb, San Francisco, CA (US)

( * ) Notice: Subject to any disclaimer, the term of this patent is extended or adjusted under 35 U.S.C. 154(b) by 0 days.

(21) Appl. No.: 16/440,875

(22) Filed: Jun. 13, 2019

Related U.S. Application Data

(60) Provisional application No. 62/848,922, filed on May 16, 2019.

(51) Int. Cl.
G06F 30/327 (2020.01)
G06F 30/367 (2020.01)
G06F 119/06 (2020.01)

(52) U.S. Cl.
CPC .......... *G06F 30/327* (2020.01); *G06F 30/367* (2020.01); *G06F 2119/06* (2020.01)

(58) Field of Classification Search
USPC ........................................................ 716/104
See application file for complete search history.

(56) References Cited

U.S. PATENT DOCUMENTS

| 8,225,251 | B2 | 7/2012 | Newcomb | |
|---|---|---|---|---|
| 8,484,590 | B2 | 7/2013 | Newcomb | |
| 8,504,957 | B2 | 8/2013 | Newcomb | |
| 8,504,968 | B2 | 8/2013 | Newcomb | |
| 8,881,076 | B2 | 11/2014 | Newcomb | |
| 9,378,324 | B2 | 6/2016 | Newcomb | |
| 2005/0143966 | A1* | 6/2005 | McGaughy | G06F 30/367 703/3 |
| 2011/0196642 | A1 | 8/2011 | Newcomb | |
| 2012/0110528 | A1* | 5/2012 | Newcomb | G06F 30/3323 716/106 |

OTHER PUBLICATIONS

US 8,595,600 B2, 11/2013, Newcomb (withdrawn)

* cited by examiner

*Primary Examiner* — Mohammed Alam
(74) *Attorney, Agent, or Firm* — Stephen E. Zweig

(57) ABSTRACT

Method for automatically analyzing complex electronic circuit designs for generalized types of floating FET gate circuit design errors that encompass both standard floating gate issues and previously difficult-to-find high impedance situations. The invention views electronic circuits as comprising a large number of "circuit stacks", each stack having a small number of electronic devices between a given power and ground rail within the circuit. The invention uses a computer processor and a recursion algorithm to automatically analyze circuit netlists, determine the different circuit stacks, stack input-output functions, and stack devices, and use an expression algorithm to determine a logical expression of the given stack's input-output function. The invention determines nodes that are connected to various FET gates, and checks if various given FET gates are connected to any DC-pin devices that might produce floating or high-impedance floating input to these FET gates, thus causing that particular FET gate to float.

21 Claims, 6 Drawing Sheets

*bias_out state "Z" if the following are met:* true
(diode to ground can be "Z")

-- and --

P1 "enable" in state "Z-up"
(PMOS FET will be off when gate high).

*Reduced:*

➤ Node "enable" in state "Z-up"

LOGICAL DETECTION OF HIGH IMPEDANCE FLOATING FET GATES

BACKGROUND OF THE INVENTION

Field of the Invention

This invention is in the field of software for the design of electronic circuits.

Description of the Related Art

Virtually all integrated electronic circuits are exhaustively tested during the design process, up to the point of manufacture. Almost all of that testing is based on computerized time-domain simulation methods, exemplified by Berkeley SPICE and other SPICE variants. These prior art SPICE type computer circuit simulation methods typically operate upon a computer file, often called a netlist, that describes the various devices in the circuit, and how these devices are connected.

Nearly all of these prior art circuit simulation methods are based on the idea of checking actual circuit behavior against expected circuit behavior (expectations), such as:

An amplifier re-creates a given input signal, but with higher amplitude.

A display driver properly re-assembles a visual image as X-Y data on a screen, given an input video signal.

A wake-up circuit powers up a cell phone when a special button is pressed.

Other combinations of circuit desired behaviors and outcomes.

During the circuit design process, circuit design engineers and verification engineers typically run these prior art SPICE type simulations many times on a particular circuit, often at many phases of the design. However, each time the intent behind the simulation remains the same, which is to verify the behavior of the circuit in question.

On the other hand, the reliability of a circuit is a different focus and is not well covered by prior art SPICE type simulations. Even a circuit that is performing or behaving within expectations, may not be a reliable circuit.

This problem is due, in part, to the fact that prior art SPICE type circuit simulation methods are based on the idea of giving specific operating conditions. They tend to operate on a: "a question asked is a question answered" type basis. The problem is that if the prior art SPICE-type simulation is not fed accurate operating conditions, the simulation will not answer all of the right questions. In particular, using prior art SPICE type circuit simulation methods, some types of circuit design problems will often go undetected.

MOSFET (Metal-Oxide-Semiconductor Field Effect Transistor) circuits tend to have a particular weakness often referred to as "floating gates". This type of design weakness is difficult to capture in simulation and thus is not well tested in electronic circuits. Note that in this disclosure, the term "MOSFET" will frequently be abbreviated as simply "FET" (Field Effect Transistor).

Electronic circuits, particularly those within integrated circuits, are susceptible to a reliability risk we can call "floating gates". In MOSFET technology (used for 99.9% of all electronic products), it is crucial that there be no "floating gates" present in a given circuit. A "floating gate" usually causes (A) undesired behavior, or (B) permanent damage to the circuit.

In addition to prior art SPICE type circuit simulation methods, other work on alternative types of computerized circuit analysis methods includes the work of Newcomb, U.S. patent application Ser. No. 12/870,753 and U.S. Pat. Nos. 8,225,251; 8,484,590; 8,504,957; 8,504,968; 8,595,660; 8,881,076; and 9,378,324; the entire contents of these applications are incorporated herein by reference.

BRIEF SUMMARY OF THE INVENTION

As will be discussed in more detail shortly, in some embodiments, the invention may be a computerized method or system for logically analyzing different circuit stacks within an electronic circuit design for a presence of Floating FET gates, such as high-impedance floating FET gates (HI-Floating FET gates). HI-Floating FET gates are a more extended class of floating FET gates that are driven by, and logically represented by, undefined voltage and/or inadequate holding current.

Expressed in methods terminology, the invention can be a method of automatically scanning an electronic circuit design (usually for an integrated circuit chip, where the design comprises a large number, often thousands, millions, or even billions, of various electronic devices connected by a circuit design and topology, often input as a netlist file), using at least one computer processor and a recursion algorithm. Such electronic circuit designs typically organize at least some of the circuit's various devices according to a plurality (often thousands or more) of circuit stacks, where each stack has its own DC path between the stack's power and ground connection rails.

The invention automatically analyzes these different circuit stacks in their DC paths between their various power and ground rails in this electronic circuit design. These circuit stacks have input-output functions, and the invention determines, for these different circuit stacks, those stack's devices that were encountered along a given stack's particular DC path. Then, for these various circuit stacks and stack devices, the invention further uses an expression algorithm to determine a logical expression of a given circuit stack's input-output function, and automatically saves expression records of these different stack's expressions, usually in computer memory.

To speed up execution, the method may automatically determine if a given circuit stack's input-output function is a known risk-free function, and if so this stack may optionally be examined in less detail. At least for those stacks that do not correspond to risk free function, the invention will then automatically determine nodes that are connected to at least one circuit FET gate, thereby defining proposed suspect nodes and "victim" FET gates that should be inspected further in case that "victim" (or potential victim) FET gate could be a floating gate.

If a given (potential) victim FET gate is associated with a stack that cannot be determined by the system to be not risk-free, according to the method, the computer processor will then then scan those suspect nodes connected to (potential) victim FET gates to determine if a given suspect node is connected to any DC-pin devices that, in at least some states, produce a generalized type of floating input (HI-Floating input) to the (potential) victim FET gates, thereby determining if the (potential) victim FET gate is a more generalized type of floating gate, here termed a HI-Floating FET gate.

The invention is based, in part, on the insight that there are three general reasons why prior art SPICE-type simulation methods tend to overlook floating gate issues.

1: Limitations caused by the prior art (SPICE simulation type) "question asked/question answered" format: Here, often the circuit designers may not be aware of all the operating conditions that a given circuit might be encounter during real-life, end-user, operation. As a result, circuit designers typically only provide a limited set of different operating conditions to analyze during such prior art, SPICE type, simulation. As a result, the circuit designer typically only simulates a limited set of outcomes, thereby not discovering other conditions that would lead to floating gates. In other words, the designers failed to detect a problem, using the prior art SPICE-type simulation methods, because they "didn't ask the right question."

2: Even if the circuit designer did ask the right question, prior art SPICE type simulations may still miss critical problems. This is because prior art SPICE type circuit simulation methods are not good at pinpointing the root cause of an underlying issue. SPICE type circuit simulation methods can be viewed as basically comprising an ocean of dynamic values. Thus, even when the circuit designer does provide the right operating conditions (as per point 1, above), prior art SPICE type simulators may still show misleading information. This can often be a serious enough problem to either confuse the circuit designer and throw him off track or cause the circuit designer to ignore warnings generated by the SPICE type simulator.

For example, a prior art SPICE type simulator might arrive at the case of a floating gate, but then handle it as one of the many other values that it is simulating. This floating gate value then propagates further into the simulation, resulting in increased current values further away from the actual point (location) of the floating gate. The circuit designer might see an indication of increased current (caused by the improper floating gate), but perhaps not be alarmed because "increased" is not actually high enough to pass a threshold of concern. Alternatively, if the circuit designer, in looking at the prior art SPICE type simulator results, does notice the increased current, it will be buried in the massive data set of results generated by the simulator, escape review, and thus get ignored.

3: Prior art SPICE-type simulation results may also vary based on other factors as well. For example, the underlying computer file or netlist that describes the circuit design is usually an "ideal netlist" that assumes that the circuit has as perfect MOSFETs (e.g. computer model assumes a perfect MOSFET), perfect resistors, and other components. In reality, a real electronic circuit will also be influenced by the unintended aspects of the real circuit. Real circuits, for example, exhibit various problems, such as certain parasitic behaviors. These parasitic behaviors come from the manufacture of the physical implementation of the actual (real) computer circuit.

One such parasitic aspect is crosstalk. An ideal circuit netlist will have no crosstalk. A prior art SPICE-type simulation, running on an ideal circuit netlist, will tend to miss floating gates and floating nodes because, in a "perfect" or "ideal" SPICE-type simulation, the voltage of a floating node can be sustained in isolation. When "perfect" components are simulated using prior art methods, the simulation will not show any change in voltage, and thus the prior art simulation fails to detect the floating node.

By contrast, in a real circuit, due to parasitic cross-coupling capacitance effects, there can be significant crosstalk between nodes. If the circuit has a floating gate, in a real circuit the voltage of this float can change. When a node voltage changes, this is a change in the node state, which results in unpredictable circuit behavior. This unpredictability can, in turn, lead to poor circuit reliability.

With prior art SPICE-type simulation methods, it is often not practical to simulate these parasitic effects. This is because the amount of parasitic data far exceeds the original ideal circuit data (for every one MOSFET in the ideal data, there can be 10× parasitic elements. Attempting to simulate all of these parasitic effects produces a prior art type SPICE simulation load ten times or even hundreds of times larger than the original circuit. This is more than enough to completely overwhelm prior art, SPICE type, simulation methods.

Although earlier work, such as the work of Newcomb, taught the use of alternative methods of analyzing circuit designs, such alternative approaches also had issues, in particular with regards to problems in circuits involving diodes and analog bias issues.

The present invention is based, in part, on the insight that to better detect floating nodes or gates (particularly FET gates) and in particular certain types of high impedance floating node situations (occasionally abbreviated as "HI-Floating FET gates"), it is useful to analyze various portions of a larger electronic circuit as a series of "stacks", where each "stack" usually comprises a DC pathway between a given power and ground rail in a larger circuit. In typical circuit designs, such "stacks" typically comprise (roughly) about two to ten MOSFET (FET) devices. In particular, according to the invention, improvements over the prior art can be obtained by configuring the computer system to "view" (e.g. logically analyze) larger electrical circuits at the "stack" level. Such "stack level" or "big picture" oriented analysis gives the computer system an improved ability to automatically detect floating gates, in particular, HI-floating FET gates involving diode devices, analog circuits, and analog bias stack issues that prior art methods would otherwise likely overlook.

In particular, the present invention is particularly good at detecting floating FET gates caused by certain diode device configuration problems, "signal path cut" problems, "collapsing amplifier" type problems, and other types of problems, that otherwise might be overlooked. These terms are defined below.

Signal Path Cut

In a signal path cut type problem, a particular gate input node is connected to one or more passgates as the only source of DC conduction. In other words, this gate node can only be driven when the passgates are functioning (active). As an example, there can be a multiplexer, constructed of passgates, but with improper passgate controls. These controls may operate the passgates in a certain combination that would leave some open states. These open states are circuit states where the multiplexer output is not actually being driven.

According to the invention, the situation where one or more passgates are turned off is called a "signal path cut" type problem. As will be discussed, the invention can detect this issue, as well as determine which passgates that are off as a result, and identify the victim (gate) that is left floating.

Put alternatively, the invention can detect situations when, as their only source of DC conduction, gate inputs of the FET gate stack devices only receive inputs from at least one passgate, and the victim FET is inadequately controlled when any of the one or more passgates are inactive.

Collapsing Amplifier

In a scenario involving analog circuits, an amplifier stack (such as in FIG. 5) may collapse to its power or ground rail. Usually, this is due to the current reference being cut off. If the current reference is cut, the amplifier goes into a high impedance state as the output value approaches the power or ground rail. According to the invention, this type of situation is termed a "collapsing amplifier" type problem.

Such collapsing amplifier problems are often encountered in power-down situations. Although the designer may, for example, intend for the circuit to power down, if the circuit acts in an unexpected or undesired manner during power down, this may create issues.

For example, if the collapsing (high impedance) amplifier output is received by a MOSFET device that is still powered on, this will cause a conditional float type situation, and the circuit may act in an undesired manner. Here the invention would term this a HI-Floating FET gate type problem that was caused by a collapsing amplifier.

Note although the invention is described as being unusually good at detecting HI-Floating FET gates, the term "HI-Floating" is not intended to be limiting. That is, the invention, while detecting certain floating gate situations, such as HI-Floating FET gates that prior art methods usually overlook, is also very efficient at detecting other floating FET gate problems as well. Thus here, the term "HI-Floating FET gate" is intended to encompass both detection of both actual HI-Floating FET gates, as well as other types of floating FET gates (e.g. non HI-Floating FET gates).

Put alternatively, in situations where the circuit stacks are configured to handle analog signals, and a given stack comprises at least one amplifier producing an output received by a victim FET gate, the invention can be configured to detect a more general type of floating FET gate. Here, to detect this type of problem, the invention can use an expression algorithm that is configured to detect the above type of situation where a current reference to the at least one amplifier can be cut, causing the amplifier to produce a high impedance output to the victim FET gate, and producing a HI-Floating FET gate.

Other Types of Floating Gate Problems:

In addition to the above type floating gate situations, the invention is also capable of recognizing other types of floating gate issues as well. The invention will thus also report other types of floating gate situations, along with other information such as the name of the no-drive node, name of one or more victim FETs (e.g. FET gate left in a floating situation, and thus the "victim" of a problem elsewhere in the circuit), and other pertinent information.

DETAILED DESCRIPTION OF THE INVENTION

Figure 1:
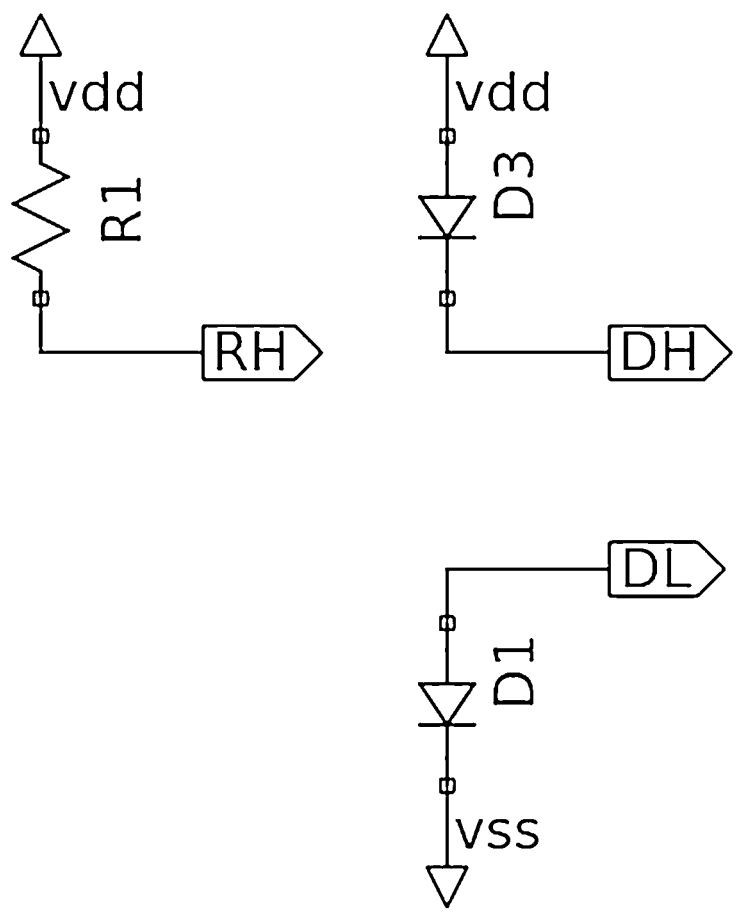
FIG. 1 illustrates the differing effects that resistors and diodes have on delivering voltage and current to a circuit node.

As previously discussed, the invention can be a system or method for automatically analyzing complex electronic circuit designs for generalized types of floating FET gate circuit design errors that encompass both standard floating gate issues and previously difficult-to-find high impedance situations. The invention views electronic circuits as comprising a large number of "circuit stacks", each stack having a small number of electronic devices between a given power and ground rail within the circuit. The invention uses a computer processor and a recursion algorithm to automatically analyze circuit netlists, determine the different circuit stacks, stack input-output functions, and stack devices, and use an expression algorithm to determine a logical expression of the given stack's input-output function. The invention determines nodes that are connected to various FET gates, and checks if various given FET gates are connected to any DC-pin devices that might produce floating or high-impedance floating input to these FET gates, thus causing that particular FET gate to float.

The computer hardware that can be used to implement the present invention can typically comprise the computer processors, memory, and other computer hardware components as described by U.S. Pat. Nos. 8,225,251; 8,484,590; 8,504,957; 8,504,968; 8,595,660; 8,881,076; and 9,378,324, the entire contents of which are incorporated herein by reference.

For greater clarity, a few terms will first be defined in more detail.

"Node": A connection between devices (such as 2 transistors). Often connected from the output of one electronic device, to the input of the next. The node is often said to have a value, such as 1, or 0. As will be discussed, nodes can have other values as well.

"Net": Alternate word for "node".

"State": A figure of both voltage and current at a node.

"Voltage": The common digital electronics way to specify a node state. Usually described as being either 1, or 0, but can be a value in-between 1 and 0. Note that the term "voltage" only describes the instantaneous, static voltage state, but not the ability to change voltage state.

"Current": The amount of current scales directly with impedance (e.g. the amount of opposition that a circuit presents to a current when a voltage is applied). By itself, "current" does not define a node state. Rather, the current is a measure of the ability to change voltage, or hold voltage. The current can also be thought of as "drive strength".

"Float": A node state where the voltage is not well controlled, or not predictable. Note the present invention is configured to detect high impedance situations where float can also be caused by the absence of any drive strength (e.g. no current). In a floating node state, there is either no ability to sustain a specific node voltage (such as insufficient current), or the voltage is unknown.

"Contention": A node state in which conflicting voltages are being forced onto a node. Contention is essentially the opposite of "float". That is, contention is the concentration of too much current, arriving from conflicting sources of drive strength.

"MOSFET": The type of transistor used in 99.9% of consumer electronic products. MOSFET devices (often abbreviated as simply FET devices or FET gates) require a specific state on their inputs in order to operate properly. When a MOSFET device input receives improper states (e.g. is floating) circuit malfunction will likely result.

"Passgate": Also called an "analog switch" or "transfer switch" or "transfer gate": A pair of PFET+NFET, though sometimes an NFET only or PFET only, used to relay a signal state from one side (Source pin for example) to the other (Drain pin for example). These are often used to construct multiplexers.

According to the invention, the nearly infinite range of analog voltage and current value possibilities can be represented by using a reduced set of symbols that can still capture the various combinations of voltage and current discussed above.

Voltage and Current are present:
"1": Node is driven to a "high" voltage with appropriate current; It has the appropriate impedance/drive-strength to achieve and sustain the given "1".
"0": Node is driven "low" (voltage) with appropriate strength (current) to hold.

Neither voltage nor current is present:
"Z": Node has no particular voltage, and there is no source of current. Thus, the voltage is a "wildcard" that can have any value.

However, in addition to 1, 0, and Z, there are other high impedance situations that the invention can represent, including situations where voltage is present, but the current is insufficient (inadequate current, no current) to allow for the voltage level to drive the node. This high impedance situation is represented by two additional possibilities:

"Z-up": Node has no source of current, assuming an upper voltage value (high or near high). Unlike the Z symbol, this symbol does imply an upper voltage value, but yet still has no current
"Z-down": Node has no source of current, assuming a lower voltage value (low/zero or near low/zero).

Put alternatively, and as will be discussed in more detail shortly, the invention can detect a more generalized type of floating gate situation (HI-floating FET gates) where the HI-Floating FET gates are driven by any of, and are logically interpreted by the method to be in a state level comprising any of:
Z: no defined voltage and no current
Z-up: voltage at logical 1 value, but inadequate holding current;
Z-down: voltage at logical 0 value, but inadequate holding current; and
wherein the non-HI-Floating FET gates have a state level of any of:

1: voltage at logical 1 value, and adequate holding current;
0: voltage at logical 0 value, and adequate holding current.

This type of HI-Floating situation can occur when, for example, the circuit stack devices that can produce any of a Z-up and Z-down state level comprise diodes.

In the above example, the invention may use an expression algorithm that comprises an inputs-to-outputs logical behavioral model of the stack. This logical behavioral model will preferably be configured to model the behavior of the stack devices according to any of the above 0, 1, Z, Z-up, and Z-down states.

As previously discussed, in some embodiments, the invention may be a system or method of logically analyzing different circuit stacks within an electronic circuit design (usually given as a netlist file) for a presence of HI-Floating FET gates (more generalized version of a floating FET gate) that are driven by, and logically represented by undefined voltage and/or inadequate holding current.

As previously discussed, the invention can be a system or method of automatically scanning an electronic circuit design (such as an integrated circuit chip design, typically comprising a plurality, usually thousands or more, of different circuit stacks, each with power and ground rails, where each circuit stack will have an input-output function) using at least one computer processor and a recursion algorithm, to automatically determine these different circuit stacks in the DC paths between various power and ground rails in the electronic circuit design. As previously discussed, these power and ground rails can be automatically recognized by the system using various methods, including the methods of Newcomb, U.S. Pat. Nos. 8,504,957; 8,504,968, the entire contents of which are incorporated herein by reference.

The invention will automatically determine, for the various different circuit stacks, those stack's devices that were encountered along that stack's DC path. More specifically, for these different circuit stacks, the invention will use a given stack's devices, at least one computer processor, and an expression algorithm to determine a logical expression of that given circuit stack's input-output function, and save expression records of a given different stack's expressions, usually in computer memory.

The invention may optionally speed up execution by determining if a given circuit stack's given input-output function corresponds to a known risk-free function. The computer processor automatically determines nodes that are connected to at least one FET gate, thereby defining proposed suspect nodes and (potential) victim FET gates.

Note that in this disclosure, the term "victim FET gate" will generally be used rather than "potential victim FET gate", because the invention will typically suspect these FET gates that are connected to suspect nodes as being potential victim FET gates (e.g. potentially HI-Floating FET gates) until these victim FET gates can be shown not to be HI-Floating.

If the victim FET gate is associated with a stack that is not risk-free, then the invention will automatically scan those suspect nodes connected to victim FET gates to determine if the suspect node is connected to any DC-pin devices that, in at least some states, produce HI-Floating input to said victim FET gates, thereby determining if the victim FET gate is a HI-Floating FET gate.

In a less execution speed optimized version, the invention could automatically scan FET gates that are associated with risk-free stacks as well, but this option is less efficient, and thus generally less preferred.

The invention's methods can alternatively be briefly summarized, in outline form, as a computerized system or computer-implemented method, which takes as input, a computer readable representation of a large circuit, such as an integrated circuit "chip" design, and automatically uses at least one computer processor, computer memory, and software configured as described below, to automatically perform the following operations as shown in steps 1.1 to 1.63 below.

1.1: Scan circuit to find each "stack". These stacks are defined as the DC paths (almost always running through FET devices) between power/ground rails. Such power and ground rails can be automatically recognized by the system using various methods, including the methods of Newcomb, U.S. Pat. Nos. 8,504,957; 8,504,968, the entire contents of which are incorporated herein by reference.

In the vast majority of modern integrated circuit designs, each "stack" usually comprises about two to 10 FET gates. Here the invention's computerized search and analysis technique will typically employ software recursion methods. While exploring each stack, the system's computer processor is configured to make note of (and store in memory) the various devices encountered along that stack's particular DC path. This "stack" based analytical approach one of the reasons why the invention can detect problems caused by analog bias and isolation that prior art methods might otherwise miss.

Put alternatively, the invention will typically scan the electronic circuit design, using at least one computer processor and a recursion algorithm, for different circuit stacks in a given stack's DC paths between power and ground rails. The invention will also automatically determine, for the various different circuit stacks that it is told to analyze (typically thousands of stacks or more), those stack's devices that were encountered along a given stack's DC path.

The invention will often also further use this recursion algorithm to determine, for those circuit stack devices capable of conducting DC current, if a device pin of the circuit stack device is a DC-pin that is also capable of conducting DC current, and also determine if the DC-pin is a continuation DC-pin.

For those DC-pins that the system automatically determines to be continuation DC-pins, the invention will typically then proceed recursively determining continuation nodes, creating stacked records, until the system either determines that the continuation node is a known ground rail, or until the system determines that the continuation node is a known power rail.

1.2: On completion of each stack's analysis, from those noted stack devices, the invention's computer system is then configured to form an expression of the stack function on an input-output basis. Here, this stack expression can be formed by analyzing the stack's DC inputs (power/ground-rails) and gate inputs (any FET gate; when pulled up, condition X, and when pulled down, condition Y). The system then computes a total expression of that stack's function which is the culmination of all of that stack's DC and gating factors (inputs).

Thus, in some embodiments, the expression algorithm can be a circuit stack input-output function based upon a cumulation of all DC inputs provided by that stack's power and ground rails, and all gate inputs of those FET gate type stack devices according to all their pulled-up states and pulled-down states.

Here, the invention may save the expression records of the different circuit stack's expressions by using expression records that are linked to "leg records". These leg records are configured to store overall the DC current flow conditions for any continuation paths and continuation nodes, the expression records can comprise Boolean logic representations of the circuit stack's inputs and outputs. This will be discussed in more detail shortly.

1.3 The computer system then saves the determined expression and function with the stack for later reference ("stack record") in computer memory.

In some embodiments, the invention saves expression records of the different circuit stack's expressions by recognizing topological groupings of that circuit stack's devices, and topologically determining if these topological groupings are sensitive or immune to floating node problems. The invention then stores the topological determination(s) in the expression records, and can also use these topological determinations to speed up the computerized analysis. Topological methods will be discussed in more detail later in this disclosure.

1.4 The computer system then finds each node connected to the various stack FET gates ("gate node"), throughout the circuit. This is the proposed floating node that the computer system will evaluate. On this node, there may be one or more FET gates ("victims") that may be potentially be floating FET gates.

1.5: Per victim (e.g. FET gate being evaluated as a potentially floating FET gate), retrieve the stack record (from computer memory). If the stack's function is one known to be risk-free (such as analog bias stack, or a stack that is always conducting), then that victim is safe. If all victims are found to be safe, then the system can automatically conclude that the whole gate node is safe and that therefore no further testing is needed. The system can thus skip further testing of this node, find another node to test, and start checking the other node.

Put alternatively, in some embodiments, the risk-free functions can comprise functions where the invention can determine that the circuit stack is acting an analog bias stack and/or an always conducting circuit stack.

1.6 If victims remain that could not be ruled out (as per above), then the computer system should continue testing that node in a more generic fashion. Here the system will automatically scan the node to find any devices that can drive the circuit state ("DC pin"), such as a resistor, FET S/D, diode, inductor, or other type of device.

1.6.1 For each DC pin, retrieve the stack (new) record. Propose the given node-state (float, on the victim node) and compare to the stack's expression. If the stack's expression has the given node state as output, refer to the input nodes and states as the next proposal (walking upstream, reverse engineering the proposed state, from effect to cause (reverse of cause-and-effect)).

Thus, in some embodiments, the DC-pin devices can comprise any of resistors, FET S/D devices, diodes, and inductors.

1.6.2 Prioritize the steering of exploration. In some embodiments, the system can be configured to prefer discovery of digital control signals (more often faulty), rather than analog bias/amp inputs signals, which are less often faulty. Such digital control signals can be pre-recognized by the system, according to their recognized stack function.

Put alternatively, in some embodiments, the invention will automatically distinguish circuit stacks configured to handle digital control signals from circuit stacks configured to handle analog signals, and automatically give higher (analytical) priority to analyzing those circuit stacks that are configured to handle digital signals. This is optional, but such prioritization can speed up the automated analysis, which can be computationally intensive for large integrated circuits and other complex circuits.

Here, for example, to speed up execution, the system can be configured to so that stacks with digital signals and digital functions can be automatically recognized by the complementary nature of their PFET and NFET member devices. In particular, the system can be configured to automatically recognize that a given stack is a digital (often CMOS) stack according to the following criteria:

A digital stack will have at least one PFET at stack top to power supply rail, and at least one NFET at stack bottom to ground rail.

A digital stack will have a central output net, connected to at least one PFET (leading to power rail) and at least one NFET (leading to ground rail).

A digital stack will have the gate(s) of each PFET connected to the gate(s) of at least one of the NFETs in the stack, and vice versa (e.g. gates of each NFET connected to gates of at least one PFET is same stack). Thereby forming the complementary (CMOS) function.

1.6.3 The system will then continue to build on the previous steps, calling each successive node and proposed state, working upstream, and retrieving stack records until finally either a circuit input pin is found (can be any state, satisfies the condition), or a conflict is found (e.g. the system finds multiple states that co-exist at once, which is an impossible condition.

Often the process of scanning those suspect nodes that are connected to victim FET gates will further comprise (for each DC-pin device in that circuit stack, and that circuit stack's expression record) performing a hypothetical expression process on that circuit stack. In this hypothetical expression process, the invention will typically assume that a victim FET gate is a HI-Floating FET gate, and the invention will compare the results to that circuit stack's expression records.

Then, for those suspect nodes with states determined to be output states, the invention will backtrack to those upstream input nodes that connecting to the suspect node, and repeat this hypothetical expression process on the upstream input nodes until either a circuit input pin is found and/or a logical conflict is found.

Some of these steps will be described in further detail in the sections below.

Regarding steps 1.1-1.2

Although with respect to floating gates, prior art methods tend to just consider voltage; circuit states can be viewed as being determined by the electrical properties or components of both voltage and current. According to the invention, improved results over prior art can be obtained if, when analyzing floats, the system automatically considers both of these components. These various components are discussed in FIG. 1, and in the discussion below.

FIG. 1 illustrates the differing effects that resistors and diodes have on delivering voltage and current to a circuit node.

As a first example, consider a resistor device. A resistor has the ability to deliver current.

In FIG. 1, R1 is delivering current from a high voltage supply, thus the result value on node RH is "high": It has a high voltage, and it has the backing current necessary to sustain that voltage. The node "RH" will be at a constant, predictable state.

Next, consider diode devices. A diode can deliver current in one direction, but not in the opposite direction.

In contrast to the previously discussed resistor example, a diode only has an ability to deliver current under certain conditions. In FIG. 1, diode D3 is providing a high voltage to node DH, but the current capability of the diode at that time is negligible (this is the typical transfer curve of a diode, and the invention's computer system is configured to understand this transfer curve). Thus, the state of DH is what we call a "float". That is, in this state, DH has voltage, but no current or backing strength, and is thus not adequately controlled for a greater circuit that might depend on this state. In fact, even the voltage component of this state will not be reliable. According to the invention, the computer system considers this to be in state "Z-up".

Similarly, in FIG. 1, diode D1 is influencing the voltage on node DL to be low, near zero (vss), but in that state, it has only negligible current or backing strength to hold the value of DL at a specific place. If a greater circuit depends on the value of DL, it will not be adequately controlled. Thus, according to the invention, node DL is also considered to be in a float state, but it is a different type of float state. According to the invention, the computer system considers this to be in state "Z-down".

Diodes of the previous examples were alone, without other connections. In that condition, they could not deliver any current. This is where diodes become tricky. Diode behavior varies, based on other conditions. Analog circuits depend heavily on diode behavior. The methods of the prior art do not consider this variability of diodes, and thus tend to fail to detect floating gate problems caused by this type of situation. Another problem with the prior art in this area is that it tended to not see the functions of the various devices in their broader context, resulting in either false negative or false positive reporting. By contrast, the present art views the devices a broader, "stack level" context, and thus operates with higher accuracy.

Figure 2C:
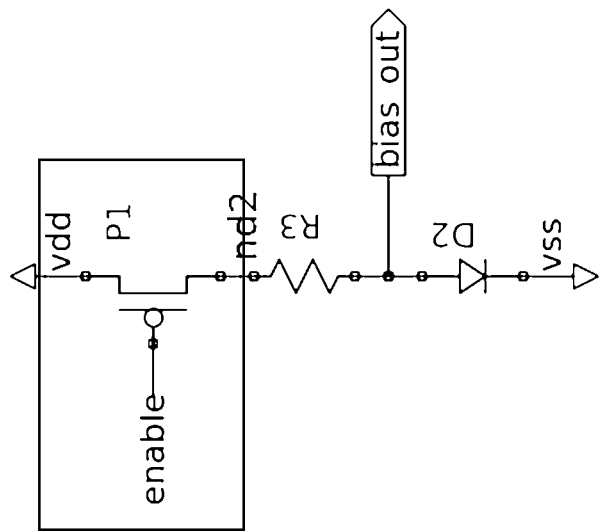
FIG. 2C shows the invention, after finding that a continuation node on diode D2 is a ground and thus terminating further exploration in that direction, then finding that another continuation node (nd2) is not a ground, but instead is connected to resistor R3. The invention thus continues to use software recursion techniques to explore this path, and next discovers that MOSFET P1. It adds MOSFET P1 to the system's stacked record as a MOSFET gate. The system then continues exploring, determines that MOSFET P1 is connected to a power rail (vdd), thus establishing that no further exploration is needed in this direction. The system has now explored the entire stack of devices (P1, R3, D2) between the power and the ground.
Figure 2B:
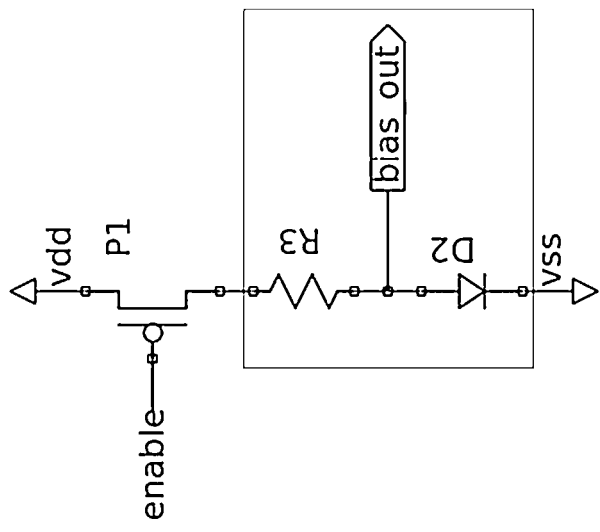
FIG. 2B shows the invention analyzing an initial node "bias out" in the circuit previously shown in FIG. 2A
Figure 2A:
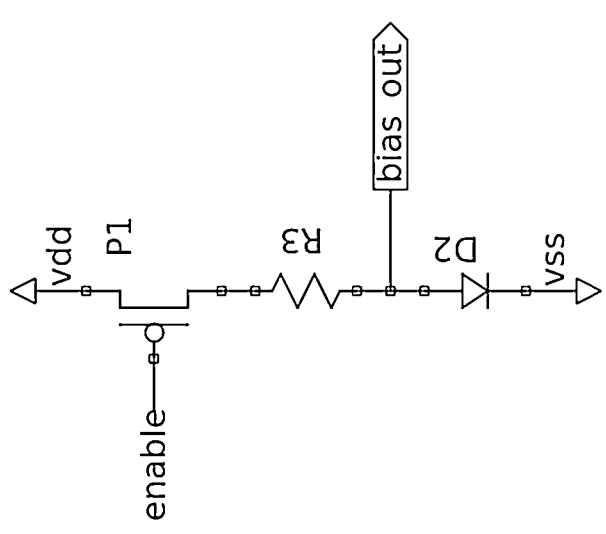
FIG. 2A shows an example of a diode D2 connected on a path between power (vdd) and ground (vss), here focusing on a specific state at node "bias out".

FIG. 2A shows an example of a diode D2 connected on a path between power (vdd) and ground (vss), here focusing on a specific state at node "bias out".

In the next example, shown in FIG. 2A, diode D2 is connected in a path from power to ground (vdd to vss). The system understands the typical transfer curve of a diode, and here recognizes that D1 will conduct current in this bias condition, from vdd, through MOSFET P1, through resistor R3, through diode D2, to vss.

The current flow through diode D2 results in a specific state at node "bias_out". The system is configured to automatically recognize that the voltage will be known (e.g. deduced) by V-forward of the diode (using the typical transfer curve, 0.6 v for most diode technologies). The system can then calculate that the current will be determined largely by the value of resistor R3. With both the voltage and current thus automatically identified, the value of node "bias_out" can also be computed and known, and adequately controlled. Hence, the system can automatically determine that there will not be a float under these conditions.

Note that, according to the invention, a key aspect of the invention is configuring the computer system to automatically use these concept(s) to determine the circuit states. Analog bias type situations, in particular, generally cannot be adequately predicted without knowing (automatically determining) the current flow between power and ground, i.e. the current flow through such stack.

An important aspect of the present invention is that it operates by automatically constructing an expression of the various inputs-to-output(s). The system in essence automatically implements a behavioral model of the given circuit stack. This simplifies processing of later steps, and also increases the speed of the analysis.

In the examples shown in FIGS. 2A, 2B, and 2C, MOSFET P1 controls the stack's DC path. If P1 is turned off (gate "enable" is driven high), then the current will not flow in resistor R3. Without current arriving on the anode of diode D2, the diode will float down to the voltage of vss (zero), simultaneously becoming high impedance (as calculated by the system using a typical diode transfer curve). The system can automatically recognize that even though the voltage is near zero (i.e. seems to be zero), the lack of current capability makes this not a "0" state, but rather a "float" case. As already mentioned, according to the invention, this state would be considered to be in state "Z-down".

Thus, according to the invention, node "bias_out" can be concluded to have the following input-output conditions, here stated in reverse (from output to input):
    bias_out=Z-down possible?: yes, if 'enable'=1
    bias_out=1: not possible
    bias_out=0: not possible
    bias_out=Z-up: not possible FIG. 2B shows the invention in the process of performing step 1.1, as previously discussed. As stated earlier, in step 1.1, the invention scans the circuit to find each "stack".

As previously discussed, for step 1.1, these stacks are the DC paths (almost always through FETs) between power/ground rails. In most modern circuit designs, these stacks are usually designed to comprise 2-10 FETs per stack. The invention uses software recursion methods to automatically perform this process. The computerized system, while automatically exploring each stack, also automatically makes notes (i.e. stores in memory) those devices encountered along any given DC path. These methods are needed in order to automatically detect problems caused by analog bias and isolation and allows the invention to detect issues that otherwise would be missed according to prior art methods.

To explain step 1.1 at a still higher level of detail, the invention can perform step 1.1 as follows:

1) Having already parsed the circuit netlist into a resident (in-memory) database, where the relationships of pins to nets, nets to pins, devices to pins, device types, and other relevant details have been established and organized, the following steps are then automatically carried out by the systems one or more computer processors:

2) Automatically select an initial node, such as "bias_out". (This choice of this particular node is not important.) Establish a record (in computer memory) for this node (the "node record") that is configured to be able to hold further information as will be discovered in subsequent steps.

3) Automatically scan each of the device pins connected to the initial node. In this example, as shown in FIG. 2B, it is Resistor R3 pin A and diode D2 pin A (anode).

Figures 3, 4:
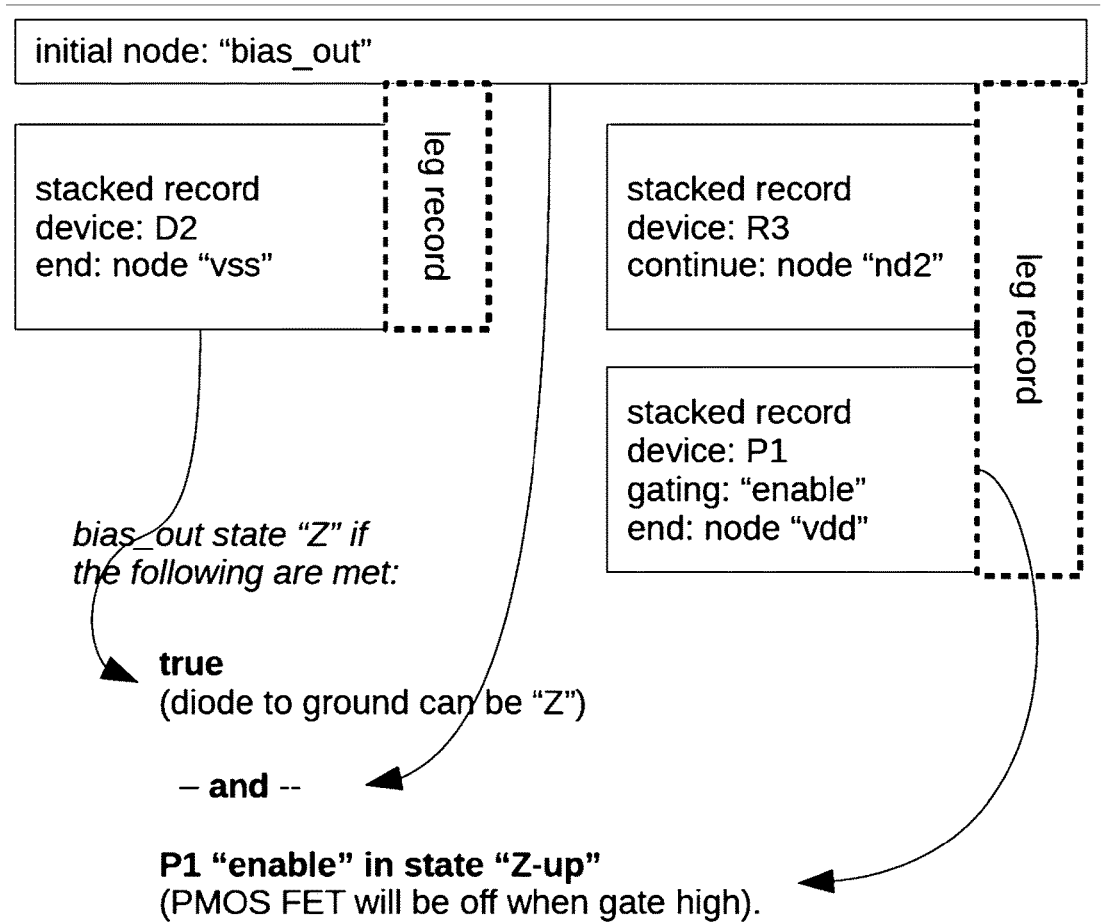
FIG. 3 shows a diagram of the "leg record" data structures (stored in computer memory) that the invention's stacked records use to hold important facts needed to establish the overall DC current flow conditions previously discussed in FIG. 2A-2C.
FIG. 4 shows some of the logical operations that the invention can automatically make using the leg record type data structure example from FIG. 3.

FIG. 2B shows the invention analyzing an initial node "bias out" in the circuit previously shown in FIG. 2A 4) For each of the connected device pins, automatically consider the device type. In both the resistor and diode case, the type is one that conducts DC current. (in contrast, for example, the system is configured to recognize that a capacitor device type would not conduct DC current).

5) For each device capable of conducting DC current on the initial node, automatically consider the next step. (This next step is actually the first step of a repetitive process, a kind of software loop, or "recursion.") For one device pin, if the pin is capable of conducting DC current (called a "DC pin"), then automatically proceed to the next step:

6) From the given DC pin ("entry pin"), automatically consult a lookup table of standard, well-known device characteristics, to translate the DC pin to a continuation DC pin:
    Resistor: pin.A to pin.B
    Diode: pin.Anode to pin.Cathode, and vice-versa
    MOSFET: pin.Source to pin.Drain, and vice-versa
    Bipolar Transistor: pin.Emitter, pin.Base, pin.Collector
    (In the above combinations, for higher speed, the system may often be configured to never bother to consider a MOSFET gate pin or any substrate pins, as these pins do not conduct or provide DC current and thus do not impact node state.)

7) Beginning a layer of software recursion: From the continuation DC pin, automatically reference its connected node (the "continuation node"). Automatically add a recursive record (or "stacked record") for this node. As part of this addition, there is a reference to the DC device by which the continuation node was found.

In summary, at this step, the following are established:
    The prior node (node of the device entry pin).
    The continuation node (node of the continuation pin, same device).
    The DC device.
    Additionally, an optional condition for the DC device ("gating term", for MOSFET only). This optional step will be described in more detail shortly.

8) In our examples in FIG. 2A-FIG. 2C, in the case of diode D2, the system automatically has found that the continuation node (on diode D2 pin Cathode) is a known ground ("vss"). As a ground rail, the system automatically recognizes this as one endpoint of exploration. The system has thus determined that this stack has one endpoint as diode D2, connected to ground. The system is configured to determine that there is no further exploration needed along this lower path, and recursion is allowed to return (e.g. automatically resets) to the initial node.

9) However, as shown in more detail in FIG. 2C, when the system automatically starts looking at another stacked record from the initial node along the upper path, in the case of resistor R3, the system can automatically determine that the continuation node ("nd2") is not a ground rail. Because it is not a ground rail, according to the software configuration, the software knows that this is not a place to stop exploration. Instead, the software is configured to automatically continue further exploration along this upper path. Following software recursion, the system determines that continuation node "nd2" should now become the initial node of the next layer of discovery ("depth-first" type exploration).

FIG. 2C shows the invention, after finding that a continuation node on diode D2 is ground and thus terminating further exploration in that direction, then finding that another continuation node (nd2) is not a ground, but instead is connected to resistor R3. The invention thus continues to use software recursion techniques to explore this path, and next discovers that MOSFET P1. It adds MOSFET P1 to the system's stacked record as a MOSFET gate. The system then continues exploring, determines that MOSFET P1 is connected to a power rail (vdd), thus establishing that no further exploration is needed in this direction. The system has now explored the entire stack of devices (P1, R3, D2) between the power and the ground.

10) Again, referring to FIG. 2C, from the node "nd2", the system automatically follows another layer of recursion to continue through MOSFET "P1". As before, the system automatically finds a continuation pin by associating the MOSFET P1 drain pin to the source pin. The system thus automatically creates a stacked record for this MOSFET P1 as the continuation device.

11) The system is configured so that when the DC device is a MOSFET, the system automatically adds, to the appropriate stacked record, the optional gating term, which is the name of the node connected to the MOSFET gate. In the example schematic, this would be node "enable" on the gate pin of MOSFET "P1", as shown in FIG. 2C.

12) In this example, to complete the stacked record for MOSFET P1, the system automatically determines that the P1 continuation node is a power rail ("vdd"). This lets the system know that that further exploration is not needed (no further recursion), and that the recursion process is now complete. Thus, with all layers of recursion complete, the system has automatically explored, for the example stack shown in FIG. 2A-2C, all of that stack's devices between that stack's power (vdd) and ground (vss) rails.

To explain step 1.2 at a still deeper level of detail, the invention can perform step 1.2 as follows. As a reminder, step 1.2 is that on completion of each stack, from the noted devices, form an expression of the stack function: input-output. This stack expression is automatically formed by computing the DC inputs (power/ground-rails) and the gate inputs (any FET gate; when pulled up, condition X, and when pulled down, condition Y). The total expression is the culmination of all of the DC and gating factors (inputs).

13) Each stacked record (prior steps) has access to a common "leg record" stored in computer memory. An example of this "leg record" (the term is based somewhat on the shape of this data structure), and operations that can be done using information from this leg record is shown in FIG. 3 and FIG. 4.

FIG. 3 shows a diagram of the "leg record" data structures (stored in computer memory) that the invention's stacked records use to hold important facts needed to establish the overall DC current flow conditions previously discussed in FIG. 2A-2C.

FIG. 4 shows some of the logical operations that the invention can automatically make using the leg record type data structure example from FIG. 3.

The leg record holds important facts needed by the system to compute (generally for each stack being analyzed) the overall DC current flow conditions. Generally, the system automatically creates a new leg record for each new continuation path, and the system automatically extends this outward to the ultimate power/ground node, or other quitting point (external IO that leaves the circuit).

Contained in the leg record are indicators stored in memory for:
  If the leg has a diode from anode-to-cathode (or cathode-to-anode).
  If the leg reached a power rail (or ground rail).
  If the leg has PMOS FET in path (or NMOS FET, or both).

14) The system is configured to automatically query the extracted stacked records in succession, and to determine (and retrieve or output) their parts. This output is done in the form of a final expression. Each stacked record (layer) retrieves/outputs its own "printed" parts to the prior stacked record (parent layer). For the final output, the stacked record parts are handled as follows:

A gating term, if applicable, is output (printed) as needing a high or low, depending on MOSFET device type. Example: "enable=Z-up" for high.
  If the continuation node was a recognized stopping point (power/ground/end-node), no further stacked records along the path need be examined. Instead, it is output (printed) in support of the desired state. Example: "vss=0" for ground being low.
  Alternatively, if the continuation node was not a stopping point (and thus further stacked records exist along the path), the system automatically asks for further stacked records to be output (printed) accordingly.

These record parts can then be further evaluated, displayed, printed, or stored in memory as desired.

15) When printing, the system will generally be configured to use a stacked record and the indicators in the leg record to show or suppress its members. For example, if the leg record indicates two diodes exist in opposition, then the system can use that particular stacked record to determine that current flow is not possible, and thus, suppress any mention of its own terms. In other words "no entry" or "not possible".

16) As shown in FIG. 4, the system can then reduce the expression by typical Boolean logic (combinations of AND/OR). The final reduced expression is the ultimate, simplified representation of stack inputs to outputs With respect to both steps 1.2 and 1.6.2 (which teaches prioritizing the analysis to prefer digital control signals), please see the following example and discussion below.

Figure 5:
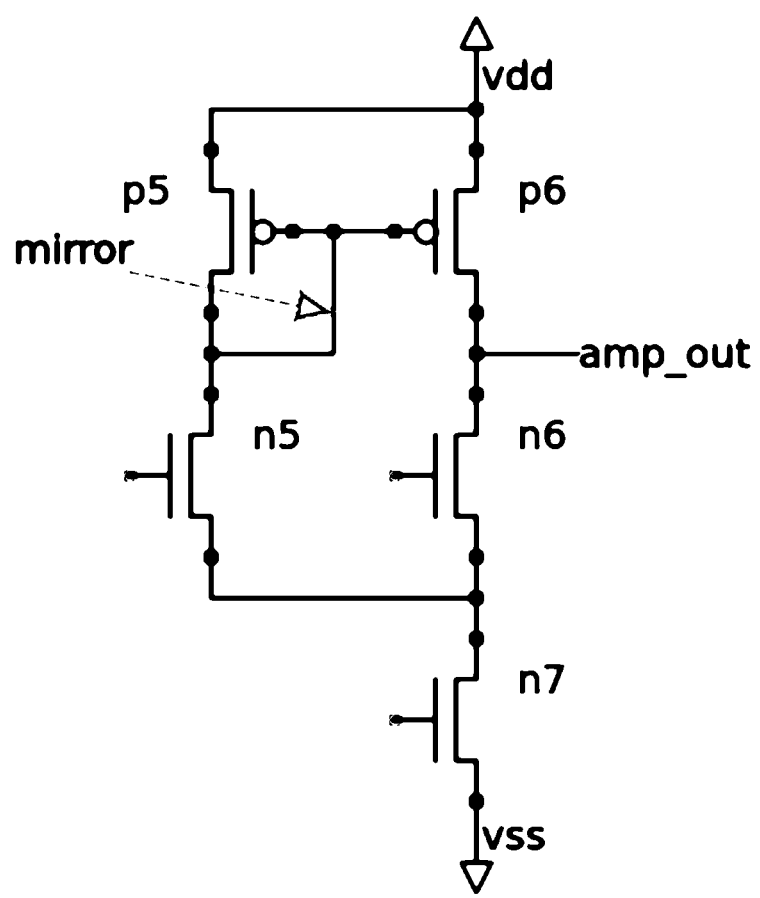
FIG. 5 shows an example of an amplifier stack extending from the power (vdd) to the ground (vss).

FIG. 5 shows an amplifier stack. This stack extends from power (vdd) to ground (vss). There is a split in the stack between FETs N6 and N7. The system can also be configured to automatically recognize that the stack comprises two parallel stack parts, all grouped together and handled in the one stack record.

FIG. 5 shows an example of an amplifier stack extending from the power (vdd) to the ground (vss).

The system can be configured to determine that the expression for this stack, from perspective of node "amp_out" as the output, is as follows:

Z-up: N7.gate=Z-down or (N5.gate=Z-down and N6.gate=Z-down)

Regarding the priority of exploration (previously discussed in step 1.6.2). While it is true that the N5 gate and N6 gate are involved in the expression, the system can automatically determine that the evaluation of these gates can be given a lower priority than evaluation of the N7 gate.

This is a common situation in analog design. The N7 "footer" NFET is the common bottleneck in this amplifier and is often used to disable the amplifier. As a disable mechanism, it will be the first place that the system should look at to determine if an inadvertent power-down causes a float situation. The system can thus be configured to investigate devices such as N7 before investigating the lower priority (and less commonly problematic) N5 and N6 amplifier inputs.

Thus, in terms of the priority of evaluation, it is more important to solve for N7 gate first, and possibly arrive at an early conclusion, before diverting system attention (e.g. computational clock cycles) to likely less problematic gates N5 and N6.

In step 1.3, as previously discussed, the system is typically configured to save the determined expression and function with the stack for later reference (e.g. create a relevant "stack record").

Grouping Topologies by Relevant Circuit Function:

In some embodiments, the system can also be configured to pre-characterize or recognize certain topological groupings of devices and circuit elements that are the basic building blocks of many circuits. These topological groupings typically have particular sensitivities to, or immunity from, floating node situations, and by recognizing these topological groupings, the system can use these known sensitivities to further refine its automatic analysis.

For example, consider the amplifier previously shown in FIG. 5. In this example, the topological grouping consists of a few basic parts:

Current Mirror: The topological grouping can be automatically determined by having the system automatically recognize the pairing of MOSFETs P5 & P6. Some topological signatures, in this case, are that both MOSFETS come from the same common power supply (vdd), and both MOSFETS drain current in parallel legs, converging on the way to ground (vss).

Amplifier Core: Once the system automatically recognizes the current mirror topology discussed below, the system can also be configured to automatically recognize the combination of this current mirror in conjunction with MOSFETs N5 and N6 (which can be automatically recognized as the "amplifier inputs", as they are inline with the current mirror parallel legs), and MOSFET N7 (which can be automatically recognized as the "current reference").

If the system later wishes to automatically test the proposal that node "amp_out" could be floating (at the input of the next/subsequent circuit stage), the system can be configured to automatically determine this as "amp_out" floating if: MOSFET N7 is gated off While MOSFETs N5 & N6 also play a role, it is known that such amplifier inputs are less commonly the source of trouble. More commonly, the current reference (N7) is the cause of trouble, and these design rules can be built into the system.

Additional Topological Considerations:

In some embodiments, the invention may be configured to find some floating gate risks by topological inspection alone. In these situations, further expression solving may not be needed.

Figure 6:
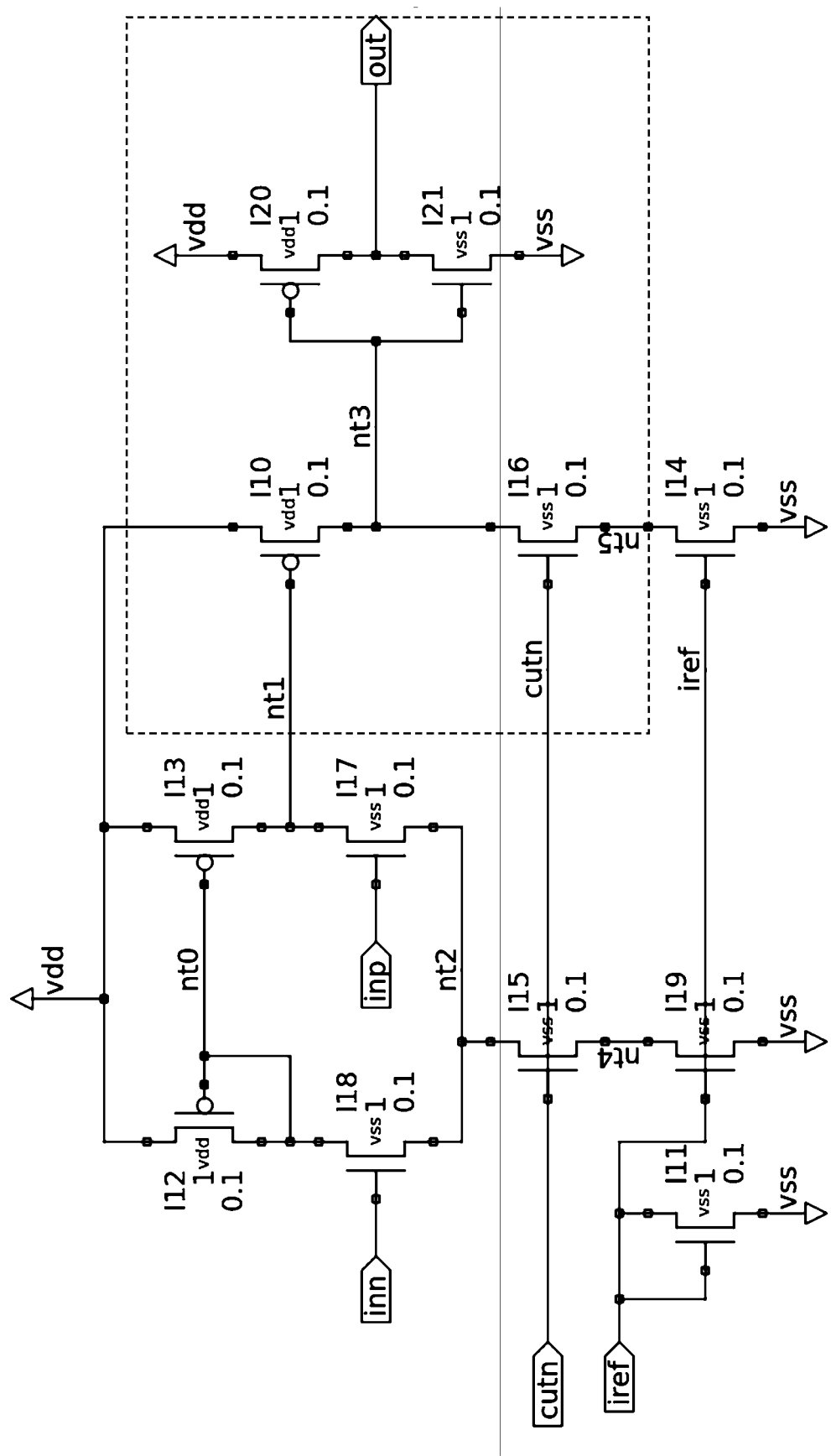
FIG. 6 shows how, in some situations, the invention can detect floating nodes by pure topological considerations.

As an example, consider FIG. 6. In this example, the circuit stack on the left comprises an amplifier section (left side) that is disabled by cutoff signal/node "cutn". This "cutn" signal cuts current in the amplifier core and in the amplifier final stage (middle stack, MOSFET I16). However, this cutoff signal/node "cutn" does not extend to the next stack, the inverter on output stack shown on the right side of FIG. 6.

FIG. 6 shows how, in some situations, the invention can detect floating nodes by pure topological considerations.

In this example, a float risk exists because if signal "cutn" is brought low, it will cut current in the stacks of MOSFETs I15 and I16, but not I21.

Here, the invention may be configured to automatically perform the following topological exploration method.

1) Follow the signal path from left to right, in "inn"→"nt0"→"nt1"→"nt3".

2) Gather the stacks involved with each stage of above.

3) Find cutoff MOSFETs in same stacks, I15, I16.

4) Observe there's no corresponding cutoff MOSFET in the stack containing I21.

In this example, the system was able to identify a problem by identifying a problematic (risk of a floating node) topology, and without needing to do further expression solving.

Figure 7:
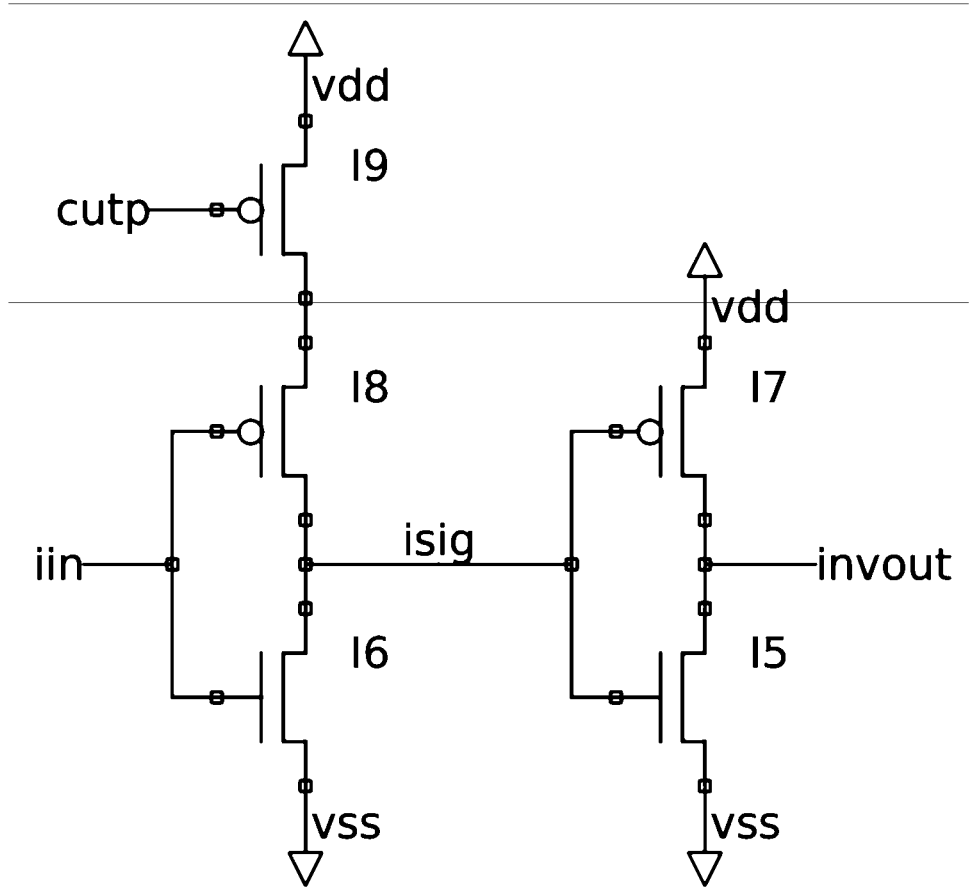
FIG. 7 shows a detail of the circuit previously shown outlined in FIG. 6. Using topological considerations, the invention has determined that under certain conditions, MOSFET I8 and I6 can directly (without cutoff MOSFET gates) stop providing power to receiver MOSSFETs I5 and I7, thus creating a conditional float situation.

Continuing this example, in FIG. 7, the system has automatically recognized that MOSFETs I8+I6 form a CMOS function (inv) as their gates are tied together (complimentary function). As such, this CMOS does not include I9, making that a power switch. Here, the invention may be configured to automatically perform the following topological exploration method.

FIG. 7 shows a detail of the circuit previously shown outlined in FIG. 6. Using topological considerations, the invention has determined that under certain conditions, MOSFET I8 and I6 can directly (without cutoff MOSFET gates) stop providing power to receiver MOSSFETs I5 and I7, thus creating a conditional float situation.

1) Follow the signal path of "iin"→"isig"→"invout".

2) At each step (above), find any cutoff MOSFET (not part of the signal path/not part of CMOS). This would be I9.

3) When arriving at the stack of I5 & I7, notice that there is no cutoff MOSFET; I7 is not gated by the same "cutp" that is gating I9.

4) As I9 can be disabled (by "cutp"), it (the driver) stops providing current to the receiver (I5 & I7). Therefore, a conditional float has been automatically proven, again without using value-based expressions.

The invention claimed is:

1. A computerized method of logically analyzing different circuit stacks within an electronic circuit design for a presence of HI-Floating FET gates that are driven by, and logically represented by, any of undefined voltage and inadequate holding current, said method comprising automatically:

scanning said electronic circuit design, using at least one computer processor and a recursion algorithm, for different circuit stacks in DC paths between power and ground rails in said electronic circuit design;

said circuit stacks having input-output functions;

determining, for said different circuit stacks, those stack's devices that were encountered along said DC path;

for said different circuit stacks, using said stack's devices, said at least one computer processor, and an expression algorithm to determine a logical expression of said circuit stack's said input-output function, and saving expression records of said different stack's expressions;

determining if said circuit stack's said input-output function is a known risk-free function;

wherein said risk-free functions comprise said circuit stack acting as any of an analog bias stack and an always conducting circuit stack;

determining nodes that are connected to at least one FET gate, thereby defining proposed suspect nodes and victim FET gates, and if said victim FET gate is associated with a stack that is not risk-free, then scanning those suspect nodes connected to victim FET gates to determine if said suspect node is connected to any DC-pin devices that, in at least some states, produce HI-Floating input to said victim FET gates, thereby determining if said victim FET gate is a HI-Floating FET gate.

2. The method of claim 1, wherein scanning those suspect nodes connected to victim FET gates further comprises, for each DC-pin device in that circuit stack, and said circuit stack's expression record:

performing a hypothetical expression process on that circuit stack, assuming that said victim FET gate is a HI-Floating FET gate, and comparing results to that circuit stack's expression records; and for those suspect nodes with states determined to be output states, backtracking to those upstream input nodes connecting to said suspect node, and repeating said hypothetical expression process on said upstream input nodes until any of a circuit input pin is found and a logical conflict is found.

3. The method of claim 1, further automatically distinguishing circuit stacks configured to handle digital control signals from circuit stacks configured to handle analog signals, and automatically giving higher priority to analyzing circuit stacks configured to handle digital signals.

4. The method of claim 1, wherein said expression algorithm is a circuit stack input output function based upon a cumulation of all DC inputs provided by said power and ground rails, and all gate inputs of those FET gate type stack devices according to all pulled-up states and pulled-down states.

5. The method of claim 4, wherein said saving expression records of said different circuit stack's expressions is done by using expression records that are linked to leg records configured to store overall DC current flow conditions for any continuation paths and continuation nodes, and said expression records comprise Boolean logic representations of said circuit stack's inputs and outputs.

6. The method of claim 1, wherein, as their only source of DC conduction, gate inputs of said FET gate stack devices only receive inputs from at least one passgate, and said victim FET is inadequately controlled when any of said at least one passgate is inactive.

7. The method of claim 1, wherein said circuit stacks are configured to handle analog signals, said stack comprises at least one amplifier producing an output received by a victim FET gate; and
said expression algorithm is configured to detect a situation where a current reference to said amplifier can be cut, causing said amplifier to produce a high impedance output to said victim FET gate, producing a HI-Floating FET gate.

8. The method of claim 1, wherein said DC-pin devices comprise any of resistors, FET S/D devices, diodes, and inductors.

9. The method of claim 1, wherein:
scanning said electronic circuit design, using at least one computer processor and a recursion algorithm, for different circuit stacks in DC paths between power and ground rails in said electronic circuit design; and
determining, for said different circuit stacks, those stack's devices that were encountered along said DC path;
further comprises:
using said recursion algorithm to determine, for those circuit stack devices capable of conducting DC current, if a device pin of said circuit stack device is a DC-pin that is also capable of conducting DC current, and determining if said DC-pin as a continuation DC-pin; and
for those DC-pins determined to be continuation DC-pins, recursively determining a continuation node, creating stacked records, until any of
a) determining said continuation node is a known ground rail;
b) determining said continuation node is a known power rail.

10. The method of claim 1, wherein and saving expression records of said different circuit stack's expressions further comprises:
recognizing topological groupings of said circuit stack's devices, topologically determining if said topological groupings are sensitive or immune to floating node problems;
storing said topological determination in said expression records; and
using said topological determinations to speed up said computerized method.

11. The method of claim 1, wherein said HI-Floating FET gates are driven by any of, and are logically interpreted by said method to be in a state level comprising any of:
Z: no defined voltage and no current
Z-up: voltage at logical 1 value, but inadequate holding current;
Z-down: voltage at logical 0 value, but inadequate holding current; and
wherein non-HI-Floating FET gates have a state level of any of:
1: voltage at logical 1 value, and adequate holding current;
0: voltage at logical 0 value, and adequate holding current.

12. The method of claim 11, wherein said circuit stack devices that can produce any of a Z-up and Z-down state level comprise diodes.

13. The method of claim 11, wherein said expression algorithm comprises an inputs to outputs logical behavioral model of said stack configured to model behavior of said stack devices according to any of said 0, 1, Z, Z-up, and Z-down states.

14. A computerized system configured to logically analyze different circuit stacks within an electronic circuit design for a presence of HI-Floating FET gates that are driven by, and logically represented by, any of undefined voltage and inadequate holding current, said system comprising:
at least one computer processor configured to use a recursion algorithm to scan said electronic circuit design for different circuit stacks in DC paths between power and ground rails in said electronic circuit design;
said circuit stacks having input-output functions;
said at least one computer processor further configured to determine, for said different circuit stacks, those stack's devices that were encountered along said DC path;
said at least one computer processor further configured to use an expression algorithm, said different circuit stacks, and stack's devices to determine a logical expression of said circuit stack's said input-output function, and to save expression records of said different stack's expressions;
said at least one computer processor further configured to determine if said circuit stack's said input-output function is a known risk-free function;
said at least one computer processor further configured to determine nodes that are connected to at least one FET gate, thereby defining proposed suspect nodes and victim FET gates, and if said victim FET gate is associated with a stack that is not risk-free, then to scan those suspect nodes connected to victim FET gates to determine if said suspect node is connected to any DC-pin devices that, in at least some states, produce HI-Floating input to said victim FET gates, thereby determining if said victim FET gate is a HI-Floating FET gate;
wherein said DC-pin devices comprise any of resistors, FET S/D devices, diodes, and inductors.

15. The system of claim 14, wherein said computer processor is further configured to scan those suspect nodes connected to victim FET gates further comprises, for each DC-pin device in that circuit stack, and said circuit stack's expression record:

said computer processor further configured to perform a hypothetical expression process on that circuit stack, assuming that said victim FET gate is a HI-Floating FET gate, and compare results to that circuit stack's expression records; and for those suspect nodes with states determined to be output states, to backtrack to those upstream input nodes connecting to said suspect node, and repeat said hypothetical expression process on said upstream input nodes until any of a circuit input pin is found and a logical conflict is found.

16. The system of claim 14, wherein said expression algorithm is a circuit stack input output function based upon a cumulation of all DC inputs provided by said power and ground rails, and all gate inputs of those FET gate type stack devices according to all pulled-up states and pulled-down states.

17. The system of claim 14, wherein:
said computer processor is configured to scan said electronic circuit design, using a recursion algorithm, for different circuit stacks in DC paths between power and ground rails in said electronic circuit design; and
determine, for said different circuit stacks, those stack's devices that were encountered along said DC path;
and wherein said computer processor is further configured to use said recursion algorithm to determine, for those circuit stack devices capable of conducting DC current, if a device pin of said circuit stack device is a DC-pin that is also capable of conducting DC current, and determining if said DC-pin as a continuation DC-pin; and
for those DC-pins determined to be continuation DC-pins, recursively determine a continuation node, and to create stacked records, until any of
a) determining said continuation node is a known ground rail;
b) determining said continuation node is a known power rail.

18. The system of claim 14, wherein said HI-Floating FET gates are driven by any of, and are logically interpreted by said system to be in a state level comprising any of:
Z: no defined voltage and no current
Z-up: voltage at logical 1 value, but inadequate holding current;
Z-down: voltage at logical 0 value, but inadequate holding current; and
wherein non-HI-Floating FET gates have a state level of any of:
1: voltage at logical 1 value, and adequate holding current;
0: voltage at logical 0 value, and adequate holding current.

19. A computerized method of logically analyzing different circuit stacks within an electronic circuit design for a presence of HI-Floating FET gates that are driven by, and logically represented by, any of undefined voltage and inadequate holding current, said method comprising automatically:
scanning said electronic circuit design, using at least one computer processor and a recursion algorithm, for different circuit stacks in DC paths between power and ground rails in said electronic circuit design;
said circuit stacks having input-output functions;
determining, for said different circuit stacks, those stack's devices that were encountered along said DC path;
for said different circuit stacks, using said stack's devices, said at least one computer processor, and an expression algorithm to determine a logical expression of said circuit stack's said input-output function, and saving expression records of said different stack's expressions;
determining if said circuit stack's said input-output function is a known risk-free function;
determining nodes that are connected to at least one FET gate, thereby defining proposed suspect nodes and victim FET gates, and if said victim FET gate is associated with a stack that is not risk-free, then scanning those suspect nodes connected to victim FET gates to determine if said suspect node is connected to any DC-pin devices that, in at least some states, produce HI-Floating input to said victim FET gates, thereby determining if said victim FET gate is a HI-Floating FET gate;
wherein said DC-pin devices comprise any of resistors, FET S/D devices, diodes, and inductors.

20. A computerized system configured to logically analyze different circuit stacks within an electronic circuit design for a presence of HI-Floating FET gates that are driven by, and logically represented by, any of undefined voltage and inadequate holding current, said system comprising:
at least one computer processor configured to use a recursion algorithm to scan said electronic circuit design for different circuit stacks in DC paths between power and ground rails in said electronic circuit design;
said circuit stacks having input-output functions;
said at least one computer processor further configured to determine, for said different circuit stacks, those stack's devices that were encountered along said DC path;
said at least one computer processor further configured to use an expression algorithm, said different circuit stacks, and stack's devices to determine a logical expression of said circuit stack's said input-output function, and to save expression records of said different stack's expressions;
said at least one computer processor further configured to determine if said circuit stack's said input-output function is a known risk-free function by analyzing if said circuit stack acts as any of an analog bias stack and an always conducting circuit stack;
said at least one computer processor further configured to determine nodes that are connected to at least one FET gate, thereby defining proposed suspect nodes and victim FET gates, and if said victim FET gate is associated with a stack that is not risk-free, then to scan those suspect nodes connected to victim FET gates to determine if said suspect node is connected to any DC-pin devices that, in at least some states, produce HI-Floating input to said victim FET gates, thereby determining if said victim FET gate is a HI-Floating FET gate.

21. A computerized system configured to logically analyze different circuit stacks within an electronic circuit design for a presence of HI-Floating FET gates that are driven by, and logically represented by, any of undefined voltage and inadequate holding current, said system comprising:
at least one computer processor configured to use a recursion algorithm to scan said electronic circuit design for different circuit stacks in DC paths between power and ground rails in said electronic circuit design;
said circuit stacks having input-output functions;
said at least one computer processor further configured to determine, for said different circuit stacks, those stack's devices that were encountered along said DC path;

said at least one computer processor further configured to use an expression algorithm, said different circuit stacks, and stack's devices to determine a logical expression of said circuit stack's said input-output function, and to save expression records of said different stack's expressions;

said at least one computer processor further configured to determine if said circuit stack's said input-output function is a known risk-free function;

said at least one computer processor further configured to determine nodes that are connected to at least one FET gate, thereby defining proposed suspect nodes and victim FET gates, and if said victim FET gate is associated with a stack that is not risk-free, then to scan those suspect nodes connected to victim FET gates to determine if said suspect node is connected to any DC-pin devices that, in at least some states, produce HI-Floating input to said victim FET gates, thereby determining if said victim FET gate is a HI-Floating FET gate;

wherein said expression algorithm is a circuit stack input output function based upon a cumulation of all DC inputs provided by said power and ground rails, and all gate inputs of those FET gate type stack devices according to all pulled-up states and pulled-down states wherein said computer processor is further configured to scan those suspect nodes connected to victim FET gates further comprises, for each DC-pin device in that circuit stack, and said circuit stack's expression record:

said computer processor further configured to perform a hypothetical expression process on that circuit stack, assuming that said victim FET gate is a HI-Floating FET gate, and compare results to that circuit stack's expression records; and for those suspect nodes with states determined to be output states, to backtrack to those upstream input nodes connecting to said suspect node, and repeat said hypothetical expression process on said upstream input nodes until any of a circuit input pin is found and a logical conflict is found.

\* \* \* \* \*